: US 9,121,472 B2
: Sep. 1, 2015

(12) United States Patent
Lach et al.

(10) Patent No.: US 9,121,472 B2
(45) Date of Patent: Sep. 1, 2015

(54) INTERNAL COMBUSTION ENGINE WITH COMPENSATION WEIGHT ARRANGED ON THE CRANKSHAFT AND SERVING AS AN IMBALANCE, AND METHOD FOR PRODUCTION OF THE CRANKSHAFT

(71) Applicant: Ford Global Technologies, LLC, Dearborn, MI (US)

(72) Inventors: Rainer Lach, Wuerselen (DE); Joerg Bonse, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/156,305

(22) Filed: Jan. 15, 2014

(65) Prior Publication Data

US 2014/0245985 A1    Sep. 4, 2014

(30) Foreign Application Priority Data

Mar. 1, 2013    (DE) .......................... 10 2013 203 560

(51) Int. Cl.
*F02B 75/06*    (2006.01)
*F16C 3/04*    (2006.01)
*F16F 15/28*    (2006.01)

(52) U.S. Cl.
CPC .................................... *F16F 15/283* (2013.01)

(58) Field of Classification Search
CPC ......... F16F 15/264; F16F 15/22; F16F 15/26; F16F 15/322; F16F 3/20; F16F 15/283; F16C 3/20; B24B 5/428
USPC .............. 123/192.1, 192.2; 74/595, 596, 603, 74/604
See application file for complete search history.

(56) References Cited

U.S. PATENT DOCUMENTS

| | | | | | |
|---|---|---|---|---|---|
| 2,246,857 | A | * | 6/1941 | Owens et al. | 92/150 |
| 2,680,387 | A | * | 6/1954 | White et al. | 74/603 |
| 3,538,788 | A | * | 11/1970 | Patchen | 74/603 |
| 4,033,016 | A | * | 7/1977 | Mayer | 29/888.08 |
| 4,407,169 | A | * | 10/1983 | Menen | 74/604 |
| 4,517,933 | A | * | 5/1985 | Yasutake | 123/54.4 |
| 4,730,512 | A | * | 3/1988 | Ito et al. | 74/595 |
| 5,063,892 | A | * | 11/1991 | Maiorana | 123/192.2 |
| 5,481,942 | A | * | 1/1996 | Baek | 74/603 |
| 5,664,464 | A | * | 9/1997 | Carson | 74/603 |

(Continued)

FOREIGN PATENT DOCUMENTS

| | | |
|---|---|---|
| DE | 2746203 A1 | 4/1979 |
| DE | 2904387 A1 | 8/1980 |

(Continued)

*Primary Examiner* — Marguerite McMahon
*Assistant Examiner* — Tea Holbrook
(74) *Attorney, Agent, or Firm* — Julia Voutyras; Alleman Hall McCoy Russell & Tuttle LLP

(57) ABSTRACT

An internal combustion engine with a cylinder and with a crank drive is described herein. The internal combustion engine includes a crankshaft in which the crankshaft mounted in a crankcase has an associated crankshaft throw for the cylinder. The internal combustion engine further includes a compensation weight serving as a counterbalance for mass compensation arranged on the crankshaft on the side opposite the crankshaft throw, where the compensation weight includes an outward-facing side and a distance from a peripheral surface of the outward-facing side to a longitudinal axis of the crankshaft is not constant along the length of the peripheral surface of the outward-facing side.

14 Claims, 2 Drawing Sheets

(56) References Cited

U.S. PATENT DOCUMENTS

| | | | |
|---|---|---|---|
| 6,295,962 B1* | 10/2001 | Walker | 123/192.2 |
| 6,398,655 B1* | 6/2002 | Orlamunder et al. | 464/68.1 |
| 6,427,657 B1* | 8/2002 | Egleston | 123/192.2 |
| 6,688,272 B2* | 2/2004 | Brevick et al. | 123/192.2 |
| 7,040,273 B2* | 5/2006 | Glinsner | 123/192.2 |
| 8,757,027 B2* | 6/2014 | Williams | 74/603 |
| 8,918,994 B2* | 12/2014 | Chottiner et al. | 29/888.08 |
| 2006/0150944 A1* | 7/2006 | Stott et al. | 123/197.4 |
| 2007/0068608 A1* | 3/2007 | Barth | 148/668 |
| 2012/0042854 A1* | 2/2012 | Lee et al. | 123/48 B |
| 2014/0311441 A1* | 10/2014 | Lach et al. | 123/197.4 |

FOREIGN PATENT DOCUMENTS

| | | |
|---|---|---|
| DE | 3925181 A1 | 2/1990 |
| DE | 4003468 A1 | 8/1991 |
| DE | 4136331 A1 | 5/1992 |
| DE | 19948138 A1 | 4/2001 |
| GB | 2279426 A | 1/1995 |

* cited by examiner

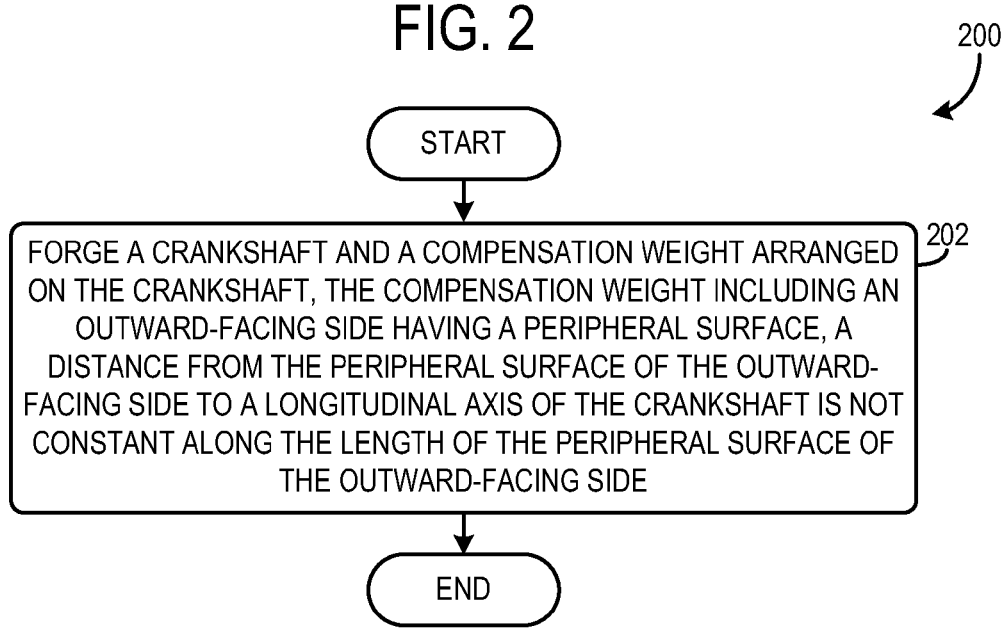

INTERNAL COMBUSTION ENGINE WITH COMPENSATION WEIGHT ARRANGED ON THE CRANKSHAFT AND SERVING AS AN IMBALANCE, AND METHOD FOR PRODUCTION OF THE CRANKSHAFT

CROSS REFERENCE TO RELATED APPLICATION

The present application claims priority to German Patent Application Number 102013203560.8, filed Mar. 1, 2013, which is hereby incorporated by reference in its entirety for all purposes.

FIELD

The present disclosure relates to an internal combustion engine having a compensation weight serving as a crankshaft counterbalance and method for operating such an internal combustion engine.

BACKGROUND AND SUMMARY

A drivetrain in an engine may comprises a crankshaft, pistons, piston pins, and connecting rods, which are each pivotally connected to the associated piston via the piston bolt arranged in the small connecting rod eye and mounted rotatably on a crank journal of the crankshaft in the large connecting rod eye. The pistons are configured to transmit the gas forces generated by combustion to the crankshaft. The gas forces are transmitted through the pistons to the piston bolts, connecting rods, and the crankshaft. The arrangement described of piston, piston bolt, connecting rod and crankshaft transforms the oscillating motion of the piston into a rotary motion of the crankshaft. The connecting rod may move partly rotationally and partly oscillating in the direction of the cylinder bore longitudinal axis.

Various components in the drivetrain such as the crankshaft, piston, etc., may generate vibration during engine operation. The vibrations in these components may be transferred to other components in the engine as well as vehicle components, which may include camshafts, the vehicle cabin, vehicle tires, engine compartment, etc. It may be desirable to attenuate vibration generated in these components to reduce noise, vibration, and harshness (NVH) in the vehicle and engine which may negatively impact customer satisfaction as well as component longevity.

Therefore, compensation weights (e.g., counterweights) may be used in crankshafts to attenuate vibrations. However, the compensation weight may not attenuate a desired amount of vibrations due to packaging constraints. For instance, the crankcase may spatially constrict the shape and size of the counterweights. Therefore, the counterweights may be positioned outside the crankcase in an attempt to attenuate a desired amount of vibration generated in the drivetrain. However, positioning the counterweight outside of the crankcase may decrease the compactness of the engine as well as increase manufacturing costs. Furthermore, increasing the mass of the counterweight may also increase fuel consumption. For instance, the counterweights positioned external to the crankcase may have additional weight which increased losses in the drivetrain. Therefore, there may be tradeoffs between crankshaft vibration attenuation and fuel consumption in previous engines.

As such in one approach, an internal combustion engine with a cylinder and with a crank drive is provided. The internal combustion engine includes a crankshaft in which the crankshaft mounted in the crankcase has an associated crankshaft throw for the cylinder. The internal combustion engine further includes a compensation weight serving as a counterbalance for mass compensation arranged on the crankshaft on the side opposite the crankshaft throw, where the compensation weight includes an outward-facing side and a distance from a peripheral surface of the outward-facing side to a longitudinal axis of the crankshaft is not constant along the length of the peripheral surface of the outward-facing side.

Shaping the counterweight in this way enables the counterweight to be positioned within the crankcase, if desired, while attenuating a desired amount of vibration generated via the drivetrain. As a result, the compactness of the engine may be decreased if desired, NVH in the engine is reduced, and the manufacturing costs may be decreased, thereby increasing customer satisfaction.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 2 shows a method for production of the crankshaft of an internal combustion engine.

Figure 1:
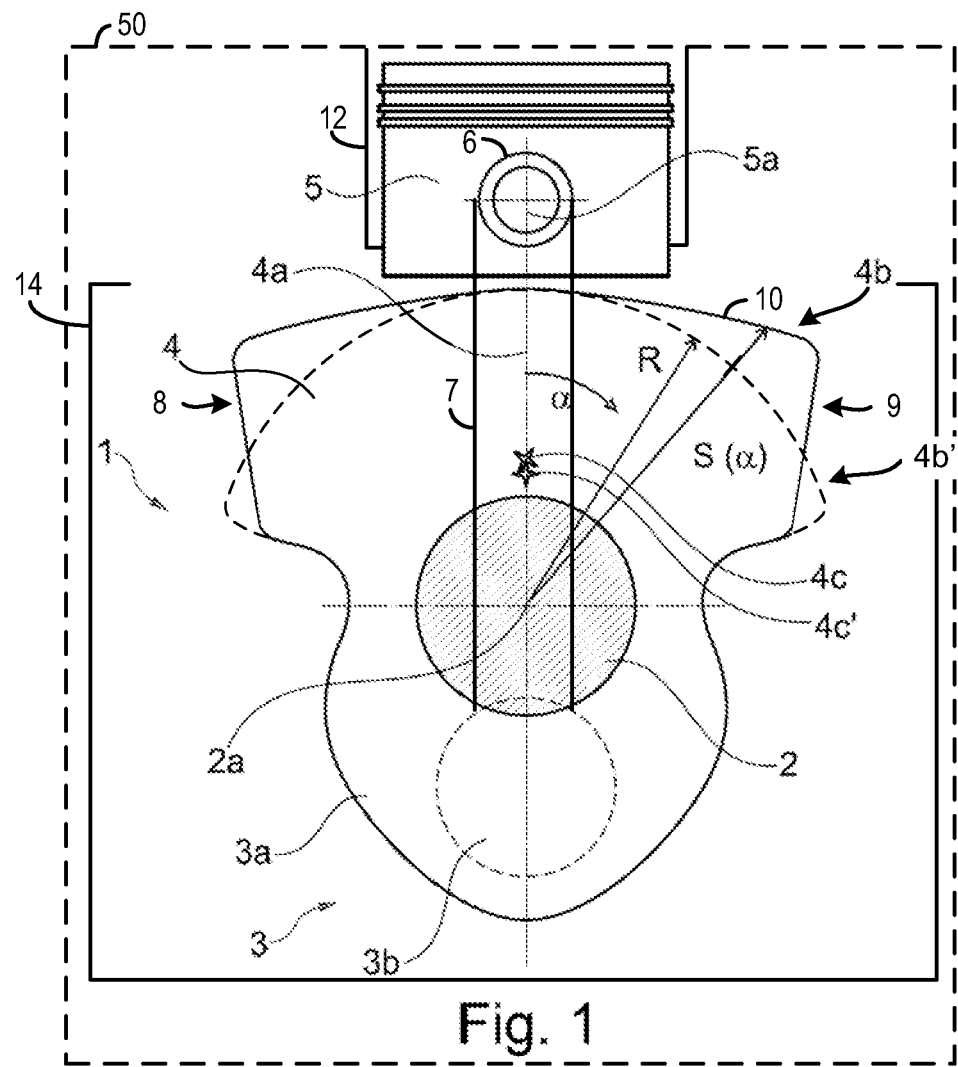
FIG. 1 diagrammatically, parts of the crank drive of a first embodiment of the internal combustion engine in side view.

The invention is described in more detail below with reference to FIG. 1 and FIG. 2.

DETAILED DESCRIPTION

An engine may comprises a crankshaft, pistons, piston pins and connecting rods, which are each pivotally connected to the associated piston via the piston bolt arranged in the small connecting rod eye and mounted rotatably on a crank journal of the crankshaft in the large connecting rod eye. The pistons are configured to transmit the gas forces generated by combustion to the crankshaft.

The gas forces may press the pistons downward in the direction of the cylinder bore longitudinal axis, wherein starting from the top dead center (TDC), the piston is forced into an accelerated movement by the gas forces. The piston, which tries to escape the gas forces with its downward directed movement, carry with it on this downward directed movement the connecting rod which is pivotally connected thereto. For this, the piston conducts the gas forces acting thereon to the connecting rod via the piston bolt, and tries to accelerate this downward. As the piston approaches bottom dead center (BDC), together with the components connected thereto, in particular the connecting rod, it decelerates in order then to complete a movement reversal at the bottom dead center (BDC).

The internal combustion engine and the associated components in the vehicle (e.g., ancillaries) can be characterized as a vibrational system. The vibration behavior of the vibration system can be influenced by various factors. Vibrational systems or components under shock and force excitation include the crankcase, cylinder block, cylinder head, valve drive and crank drive, which is are also described herein. These components may be exposed to the mass and gas forces.

The temporally changing rotary forces, which are introduced into the crankshaft via the connecting rods pivotally mounted at the individual crank journals, may excite the crankshaft into rotational vibrations. These rotational vibrations may lead both to noise from structure-borne sound emission and noise from structure-borne sound transmission into the bodywork and into the internal combustion engine, wherein vibrations can also occur which have a disadvantageous influence on driving comfort, for example vibrations of the steering wheel in the passenger compartment. When the crankshaft is excited in its inherent frequency range, high rotational vibration amplitudes can occur, which can even lead to fatigue fracture. This shows that the vibrations are important not only in connection with noise design, but also with regard to component strength.

The rotational vibrations of the crankshaft may also be transmitted undesirably to the camshaft via the timing drive or camshaft drive, wherein the camshaft is itself also a vibrational system and can excite further systems, in particular the valve drive, to vibration. Vibrations can also be transmitted to other ancillary components via traction means driven by the crankshaft. Also the vibrations of the crankshaft may be transmitted to the drivetrain, via which they can be transmitted as far the vehicle tires.

The rotary force development at a crankshaft throw of a four-stroke internal combustion engine is periodic, wherein the periods extend over two revolutions of the crankshaft. The rotary force development may be broken down into its harmonic elements by Fourier analysis, to allow conclusions on the excitation of rotary vibrations. The actual rotary force development consists of a constant rotary force and a plurality of harmonically changing rotary forces, which have different rotary force amplitudes and frequencies or vibration counts. The ratio of the vibration count $n_i$ of each harmonic to rotation speed n of the crankshaft or engine is known as the order i of the harmonic.

Because of the high dynamic load on the crankshaft from the mass and gas forces, it may be desirable to provide mass compensation to the crankshaft. The term "mass compensation" covers all measures which outwardly compensate or reduce the effect of the mass forces. To this extent, mass compensation also comprises compensation of the moments provoked by the mass forces. A mass compensation can take place in individual cases by a targeted matching of the crankshaft throws, and the number and arrangement of the cylinders. Counterweights may also be provided for mass compensation.

A six-cylinder in-line engine can be balanced via the following technique. The six cylinders are combined in pairs such that they run mechanically in parallel as cylinder pairs. So the first and sixth cylinders, the second and fifth cylinders, and the third and fourth cylinders are combined into cylinder pairs, wherein the crankshaft journals or throws for the three cylinder pairs are arranged on the crankshaft each offset by 120° C.A. Running mechanically in parallel means that both pistons of the two cylinders running mechanically in parallel are at top dead center (TDC) and bottom dead center (BDC) at the same ° C.A (degree crank angle). In a three-cylinder in-line engine, the mass forces of the first order and the mass forces of the second order may be compensated by selection of a suitable crankshaft throw, but not the moments which are provoked by the mass forces.

Complete mass compensation is not always achievable, so further measures must be taken, for example the arrangement of counter weights on the crankshaft, and/or equipping the internal combustion engine with at least one balancer shaft. A starting point of all measures may be the consideration that the crankshaft may be loaded by the temporally changing rotary forces composed of the gas forces and mass forces of the crank drive. The mass of the crank drive, i.e. the individual masses of the connecting rod, piston, piston bolt, piston rings and the crankshaft itself, can be divided into an oscillating substitute mass and a rotating substitute mass. The external effect of the mass force of the rotating substitute mass may be compensated by counter weights arranged on the crankshaft.

Mass compensation may be more difficult in the case of the mass force provoked by the oscillating substitute mass, since this is composed roughly of a mass force of the first order and a mass force of the second order, wherein forces of higher orders are negligible. The mass forces of each order may be compensated by the arrangement of two contra-rotating shafts fitted with corresponding weights, known as balancer shafts. The shafts for compensating for mass forces of the first order run at the engine rotation speed, and the shafts for balancing the mass forces of the second order run at double the engine rotation speed. This method of mass compensation may be very cost-intensive, complex and as well as having a high weight, requires a great deal of space. Within the context of compensating for the mass forces of the first order, the crankshaft can simultaneously serve as a balancer shaft, i.e. it can constitute one of the two balancer shafts, so that at least the weight and space required for mass compensation is reduced.

Even when the mass forces are compensated, mass moments arise since the mass forces of the individual cylinders act in the cylinder center planes. These mass moments can in individual cases be compensated by at least one balancer shaft equipped with weights. This may further increase the space required, the costs, and the weight for the total mass compensation.

In a three-cylinder in-line engine, the moments provoked by the mass forces of the first order may be compensated for example by an individual balancer shaft contra-rotating to the crankshaft at the engine rotation speed, at the ends of which shaft two compensation weights serving as imbalance may be arranged offset by 180°, i.e. twisted.

Alternatively, the moments provoked by the mass forces of the first order in a three-cylinder in-line engine may be compensated by two contra-rotating compensation weights serving as imbalance, wherein a first compensation weight runs in the same direction as the crankshaft and a second compensation weight runs in the opposite direction to the crankshaft. The essential difference from the mass compensation described above is that the two compensation weights serving as imbalance rotate in opposition to each other. Consequently, the two compensation weights are not arranged on the same carrier, for example a shaft, but on different carriers which give them a rotary motion in different directions of rotation. The carrier for the first compensation weight can for example be the crankshaft itself or a body connected with the crankshaft, for example a flywheel. The second compensation weight may need a carrier rotating in the opposite direction to the crankshaft, which can itself also be driven by the crankshaft.

As explained in detail above, many concepts for compensating for mass forces and/or mass moments may need the arrangement of compensation weights serving as imbalance on the crankshaft. The external effect of the mass force of the rotating substitute masses for example can be compensated by compensation weights arranged on the crankshaft. Here, the at least one compensation weight serving as imbalance is arranged on the crankshaft on the side opposite at least one crankshaft throw, for the purpose of mass compensation.

Also, concepts for compensating for moments provoked by mass forces of the first order, for example of a three-cylinder in-line engine, can use compensation weights serving as imbalance which are arranged on the crankshaft.

The arrangement of compensation weights on the crankshaft in the manner described above with regard to previous engines can give rise to structural problems in the engine. When the piston passes through bottom dead center, a compensation weight, serving as imbalance and arranged on the side opposite the crankshaft throw belonging to the piston, lies immediately below the piston (i.e. on the side facing the piston). It may be desirable to inhibit contact between the piston and the compensation weight as the crankshaft rotates. Compensation weights in previous engines have a semi-circular form on the outward-facing side with regard to a rotational axis of the crankshaft. This means that in previous engine the outside of the compensation weight running in the peripheral direction has a substantially constant distance to the longitudinal axis (e.g., rotational axis) of the crankshaft.

The constricted spatial conditions in the crankcase however may make the arrangement of a compensation mass difficult, or necessitate the arrangement of comparatively large compensation masses, since the active lever, namely the distance of the center of gravity of the imbalance from the longitudinal axis of the crankshaft, is selected comparatively small, (i.e. short, because of the small construction space available).

Where applicable, because of the constricted spatial conditions, mass compensation may be provided outside the crankcase. The provision of one or several balance shafts outside the crankcase not only increases the space required in the engine bay of a vehicle and the costs, but also the fuel consumption. The increased fuel consumption is caused firstly by the additional weight of the compensation unit. Secondly the compensation unit with its rotating shafts and other moved components contributes to the friction generated in the internal combustion engine, or increases this friction generation. The latter is particularly relevant because of the fact that the compensation unit may be continuously in operation as soon as the internal combustion engine is started and operated. Therefore, a reduction in weight of the compensation weight may be desirable due to the reduce fuel consumption in the vehicle achieved via the reduction in compensation weight mass.

Additionally, it may be desirable to provide an internal combustion engine which provides increased mass compensation for the crankshaft and/or corresponding components in the engine. Additionally, a method may also be provided in the present invention for the production of the crankshaft of such an internal combustion engine.

Therefore in one example, an internal combustion engine with at least one cylinder and with a crank drive is provided. The crank drive may also be referred to as a drivetrain. The internal combustion includes a crankshaft, in which the crankshaft mounted in the crankcase has an associated crankshaft throw for each cylinder, wherein the crankshaft throws are arranged spaced apart along the longitudinal axis of the crankshaft. The internal combustion engine further includes at least one compensation weight serving as a counterbalance is arranged on the crankshaft on the side opposite at least one crankshaft throw, for the purpose of mass compensation. The at least one compensation weight does not have a semi-circular form on the outward-facing side with regard to a rotational axis of the crankshaft. In other words, rotational axis of the crankshaft is not the center of an arc of the outward-facing side. Further in some examples, the outward-facing side may not form an arc. Specifically in one example, the outward-facing side may be planar. Still further in another example, the outward-facing surface may be concave.

One of the distinctions between the crank drive described herein and previous crank drives is that the compensation weights in previous crank drives have an outward-facing side with a peripheral surface, the distance between the peripheral surface and a longitudinal axis (e.g., rotational axis) of the crankshaft being constant along the surface. On the contrary, the crank drive described herein has an outward-facing with a peripheral surface, the distance between the peripheral surface and the longitudinal axis (e.g., rotational axis) of the crankshaft varying along the length of the peripheral surface. Thus, the compensation weight described herein does not have a semi-circular form with a center at a point on the rotational axis of the crankshaft.

It will be appreciated that the longitudinal axis of the crankshaft may serve as the rotation axis of the rotating crankshaft and the rotation axis of the compensation weights rotating with the crankshaft. To this extent, the peripheral direction may be predefined by the rotating crankshaft, wherein the arcuate form of the outside of a compensation weight can be described or executed by a pointer of length R rotating in the peripheral direction.

The variation in distance between the rotational axis of the crankshaft and the peripheral surface of the compensation weight described herein allows a more effective use of the limited space available in the crankcase, i.e. for the same construction space, larger imbalance masses can be arranged on the crankshaft or greater effective levers achieved, and hence the imbalance mass desired for mass compensation can be reduced. The design of the compensation weight, described herein namely allows an increase in the distance of the center of gravity of the imbalance from the longitudinal axis of the crankshaft, i.e. the lever of the imbalance can be designed comparatively long. No mass compensation outside the crankcase need therefore be provided, if desired. However, in some examples there may be mass compensation provided external to the crankcase in addition to the mass compensation in the crankcase.

Whereas the constricted spatial conditions in the crankcase according to the prior art could lead to the mass compensation having to be arranged at least partly outside the crankcase, this can be avoided by the design of the compensation weight described herein, if desired. The internal combustion engine with the mass compensation described herein may reduce vibration generated in the drive train by a desirable amount.

In one example, the internal combustion engine described herein has a piston belonging to a cylinder pivotally connected to the crankshaft via a connecting rod, wherein the connecting rod at one end is pivotally connected to the piston via a piston bolt and at another end is mounted rotatably on a crank journal of the associated crankshaft throw of the crankshaft.

Examples of the internal combustion engine have been contemplated in which the longitudinal axis of the at least one piston intersects the longitudinal axis of the crankshaft, and when the piston is at bottom dead center (BDC), the plane spanned by the two longitudinal axes forms the center plane of the at least one compensation weight. That is to say that a plane symmetrically dividing the compensation weight may be aligned with a longitudinal axis of the piston when the piston is positioned at BDC. In this way, the compensation weight may be configured to compensate for the mass of a crankshaft throw, in one example.

In further examples, the internal combustion engine may be configured such that the outside of the at least one compensation weight running in the peripheral direction, starting from the center plane at least toward one side, has an increasingly large distance $s(\alpha)$ from the longitudinal axis of the crankshaft.

In one example, the center of gravity of the compensation weight may be shifted further to the outside by the increasing distance $s(\alpha)$, i.e. the distance of the center of gravity from the longitudinal axis of the crankshaft is enlarged, whereby the active lever of the imbalance weight increases. Further in one example, the distance gradually increases when distance $s(\alpha)$ is greater than distance R in the center plane, i.e. as the rotary angle $\alpha$ increases, the distance can reduce again as long as it is greater than R. In this context, the internal combustion engine may be configured such that the outside of the at least one compensation weight running in the peripheral direction, starting from the center plane toward both sides, has an increasingly large distance $s(\alpha)$ from the longitudinal axis of the crankshaft. The at least one compensation weight thus may have a hammer-like shape, wherein the center of gravity of the compensation weight moves further outward, i.e. the active lever of the imbalance mass increases. In this context, the internal combustion engine may be configured such that the distance $s(\alpha)$ of the outside from the longitudinal axis of the crankshaft, starting from the center plane, increases correspondingly towards both sides, so that the outside of the at least one compensation weight running in the peripheral direction is formed symmetrically to the center plane.

In one example, in the crank drive, described herein, in which the longitudinal axis of the at least one piston intersects the longitudinal axis of the crankshaft, this example may enable a design of the compensation weight such that the distance $s(\alpha)$ of the outside from the longitudinal axis of the crankshaft is dimensioned such that the distance between the at least one compensation weight and the piston remains substantially the same when the piston passes through bottom dead center and the compensation weight passes the piston.

Further in other examples, the internal combustion engine may also be configured such that the distance $s(\alpha)$ of the outside from the longitudinal axis of the crankshaft, starting from the center plane, changes differently toward the two sides. Such an example may be beneficial when the crankcase is arranged eccentrically, i.e. it has an offset and the longitudinal axis of the crankshaft runs at a distance from the longitudinal axis of the piston.

Further in one example, the internal combustion engine may be configured such that the longitudinal axis of the crankshaft runs spaced from the longitudinal axis of the piston, wherein a plane running through the longitudinal axis of the crankshaft and parallel to the longitudinal axis of the piston forms the center plane of the compensation weight when the piston is at BDC.

Further in one example, the internal combustion engine may be configured such that the distance $s(\alpha)$ of the outside from the longitudinal axis of the crankshaft is dimensioned such that the distance between the at least one compensation weight and the piston remains substantially the same when the piston passes through bottom dead center and the compensation weight passes the piston. This example of the outside of the compensation weight allows for use of the space available in the crankcase. In this respect it may not be the actual shape of the piston, but rather a piston equipped with an envelope which forms the basis. In this way, the compactness of the drive train may be increased.

In another example, the crank drive of internal combustion engine may include three cylinders and/or three corresponding crankshaft throws.

Embodiments of the internal combustion engine may also be used where the distance between the peripheral surface and the longitudinal axis of the crankshaft is given by the function $s(\alpha)$:

$$s(\alpha)=R+R[1-\cos(\alpha)+1/\lambda-1/\lambda^2(1-\lambda^2\sin^2(\alpha))^{0.5}],$$
wherein R designates the distance $s(\alpha=0)$ in the center plane,
$\alpha$ is the rotary angle of the crankshaft starting from a piston at bottom dead center, and
$\lambda$ is the ratio r/L, with L as the connecting rod length and r as the crank radius.

If the distance $s(\alpha)$ of the outside from the longitudinal axis of the crankshaft is dimensioned according to the formula above, for crank drives without offset in which the longitudinal axis of the piston intersects the longitudinal axis of the crankshaft, the distance between the compensation weight and the piston or piston envelope over rotary angle $\alpha$ remains the same when the piston passes through bottom dead center and the compensation weight passes the piston.

Embodiments of the internal combustion engine may also be used the distance between the peripheral surface and the longitudinal axis of the crankshaft is given by the function $s(\alpha)$:

$$s(\alpha)=R+R[1-\cos(\alpha)-1/\lambda(1-\lambda^2\sin^2(\alpha)+2\lambda\mu\sin(\alpha)-\mu^2)^{0.5}+1/\lambda(1-\mu^2)^{0.5}], \text{ wherein:}$$

R designates the distance $s(\alpha=0)$ in the center plane,
$\alpha$ is the rotary angle of the crankshaft starting from a piston at bottom dead center,
$\lambda$ is the ratio r/L, with L as the connecting rod length and r as the crank radius, and
$\mu$ is the ratio A/L, with A as the distance of the longitudinal axis of the crankshaft from the longitudinal axis of the at least one piston.

If the distance $s(\alpha)$ of the outside from the longitudinal axis of the crankshaft is dimensioned according to the formula above, for crank drives with offset A in which the longitudinal axis of the crankshaft runs spaced from the longitudinal axis of the piston, the distance between the compensation weight and the piston or piston envelope over rotary angle $\alpha$ remains the same when the piston passes through the bottom dead center and the compensation weight passes the piston.

In some examples, the internal combustion engine may be configured such that the compensation weight comprises an imbalance mass to compensate for the mass force of the rotating substitute mass. Further in some examples, the internal combustion engine may be configured such that the compensation weight comprises an imbalance mass to compensate for the moments provoked by the mass forces of the first order.

As already stated, the moments provoked by the mass forces of the first order, for example in a three-cylinder in-line engine but also in a five-cylinder in-line engine or a V-engine with six or eight cylinders, can be compensated by two compensation weights serving as imbalance and rotating opposite each other. A first compensation weight rotating in synchrony with the crankshaft can be arranged on the crankshaft itself, whereby no balancer shaft is provided. The crankshaft itself then assumes the function of a balancer shaft.

A method for production of the crankshaft of an internal combustion engine of the type described initially is also described herein. The method may include forging a crankshaft together with a compensation weigh arranged on the crankshaft. The crankshaft and compensation weight may be structurally similar to the crankshaft and compensation weight described herein. In one example, the crankshaft and the compensation weight may be drop-forged together. Alternatively the crankshaft can be cast together with the compensation weight arranged on the crankshaft, and then machined. A further variant would be an assembled crankshaft in which the crankshaft is constructed in modular fashion.

FIG. 1 shows, diagrammatically in a side view, parts of the crank drive 1 of an embodiment of the internal combustion engine 50 with piston 5 positioned at bottom dead center (BDC). The piston 5 is positioned in a cylinder 12. Although a single cylinder and piston are depicted it will be appreciated that the engine 50 may include additional cylinders corresponding pistons. The engine may further include crankshaft throws corresponding to the additional pistons. Specifically in one example the engine 50 may include three cylinders and three corresponding pistons and three crankshaft throws.

The crank drive 1 includes a crankshaft 2 and a piston 5 which is connected pivotally to the crankshaft 2 via a connecting rod 7, wherein the connecting rod is connected pivotally to the piston 5 via a piston pin 6 (e.g., piston bolt) in the small connecting rod eye and mounted rotatably on a crank journal 3b of the crankshaft 2 in the large connecting rod eye, in one example. The crank journal 3b is laterally delimited by two spaced crankshaft webs 3b of the associated crankshaft throw 3 in the depicted example. However, other crank journal, crankshaft web, and/or crankshaft throw positions have been contemplated.

When the crankshaft 2 is rotating about the longitudinal axis 2a, the piston 5 performs an oscillating motion along its longitudinal axis 5a (direction of rotation a indicated by arrow). The longitudinal axis 5a of the piston 5 intersects with the longitudinal axis 2a of the crankshaft 2.

On the side opposite the crankshaft throw 3, a compensation weight 4 serving as imbalance is mounted on the crankshaft 2 for the purpose of mass compensation. In the depicted example, when the piston 5 is at bottom dead center (BDC), the plane spanned by the longitudinal axis 5a of the piston 5 and the longitudinal axis 2a of the crankshaft 2 forms the center plane 4a of the compensation weight 4. However, other relative positions and/or geometries of the piston, crankshaft, and compensation weight have been contemplated. In other examples, there may be more than one compensation weight in the engine. Specifically in one example, there may be at least one compensation weight per cylinder or there may be more than one compensation weight per cylinder. A crankcase 14 may at least partially enclose the crankshaft 2 and the compensation weight 4. Additionally, the center plane 4a may extend through a longitudinal axis of a piston pin in the piston when the piston is arranged at bottom dead center.

The compensation weight 4 does not form an arc having the center point on the rotational axis of the crankshaft as known from the prior art (see dotted line) in which the outward-facing side, i.e. the outside 4b' running in the peripheral direction, has a constant distance R from the longitudinal axis 2a of the crankshaft 2 over rotary angle α. Rather, the distance s(α) between a peripheral surface 10 of the outside 4b of the compensation weight 4 running in the peripheral direction to the longitudinal axis 2a and the longitudinal axis 2a varies (e.g., increases or decreases) in magnitude along the length of the peripheral surface 10. The outside 4b may also be referred to as an outward-facing side. In the embodiment shown in FIG. 1, distance s(α) increases correspondingly towards both lateral sides (8 and 9) of the compensation weight 4 from the center plane 4a. In the depicted example the lateral sides are substantially planar. However, other lateral side contours have been contemplated. The lateral sides may be referred to as a first lateral side 8 and a second lateral side 9. The outside 4b of the compensation weight 4 running in the peripheral direction is formed symmetrically to the center plane 4a in the depicted example. However, other compensation weight contours (e.g., geometries and/or sizing) have been contemplated. The compensation weight 4 in the depicted example has a hammer-like shape, wherein the center of gravity 4c of the compensation weight 4 moves further toward the outside in comparison with a center of gravity 4c' of a conventionally designed compensation weight. Thus, the center of gravity 4c of the compensation weight 4 is moved further to the outside due to the increasing distance s(α) on both sides of the center plane 4a, i.e. the distance of the center of gravity 4c from the longitudinal axis 2a of the crankshaft 2 increases, so that the effective lever of the imbalance mass increases.

Other contours of the peripheral surface 10 have been contemplated. For example, the peripheral surface 10 may include a planar section or specifically on one example may be substantially planar across its length. However, in the depicted example the peripheral surface 10 is curved. Still further in other example, the distance s(α) may increase along the length of the peripheral surface 10 from the center plane 4a towards only the first lateral side 8 or only the second lateral side 9. Still further in other examples, the distance s(α) may increase by varying amounts toward the first lateral side 8 and toward the second lateral side 9 along the length of the peripheral surface 10.

FIG. 2 shows a method 200 for production of the crankshaft of an internal combustion engine. The method 200 may be implemented to produce the engine and crankshaft described above with regard to FIG. 1 or may be used to produce another suitable engine and crankshaft.

At 202 the method includes forging a crankshaft and a compensation weight arranged on the crankshaft, the compensation weight including an outward-facing side having a peripheral surface, a distance from the peripheral surface of the outward-facing side to a longitudinal axis of the crankshaft is not constant along the length of the peripheral surface of the outward-facing side. Specifically in one example, the crankshaft and compensation weight may be drop-forged together. Still further in another example, the crankshaft and compensation weight may be cast and/or machined.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

List of Reference Symbols
1 Crank drive
2 Crankshaft
2a Longitudinal axis of crankshaft, rotary axis
3 Crankshaft throw
3a Crankshaft web
3b Crankshaft journal
4 Compensation weight, imbalance mass
4a Center plane
4b Outside of compensation weight
4b' Outside of a compensation weight according to the prior art
4c Center of gravity of compensation weight
4c' Center of gravity of compensation weight according to the prior art
5 Piston
5a Longitudinal axis of piston
6 Piston pin
7 Connecting rod
8 First lateral side
9 Second lateral side
10 Peripheral surface
12 Cylinder
14 Crankcase
50 Engine
$s(\alpha)$ Distance of outside of compensation weight from longitudinal axis of crankshaft
$\alpha$ Rotary angle, crankshaft angle

The invention claimed is:

1. An internal combustion engine with a cylinder and with a crank drive comprising:
a crankshaft in which the crankshaft mounted in a crankcase has an associated crankshaft throw for the cylinder;
a compensation weight serving as a counterbalance for mass compensation arranged on the crankshaft on the side opposite the crankshaft throw;
where the compensation weight includes an outward-facing side and a distance from a peripheral surface of the outward-facing side to a longitudinal axis of the crankshaft is not constant along the length of the peripheral surface of the outward-facing side; and
a piston corresponding to the cylinder connected pivotally to the crankshaft via a connecting rod, wherein the connecting rod at one end is connected pivotally to the piston via a piston bolt and at another end is mounted rotatably on a crank journal of the associated crankshaft throw of the crankshaft;
wherein a longitudinal axis of the piston intersects the longitudinal axis of the crankshaft, and when the piston is at bottom dead center, a plane spanned by the two longitudinal axes forms a center plane of the compensation weight;
where the distance from the peripheral surface of the outward-facing side running in the peripheral direction to the longitudinal axis of the crankshaft is given by the function $s(\alpha)$ and $s(\alpha)=R+R\,[1-\cos(\alpha)+1/\lambda - 1/\lambda, (1-\lambda^2 \sin^2(\alpha))^{0.5}]$, where R designates the distance $s(\alpha=0)$ in the center plane, $\alpha$ is the rotary angle of the crankshaft starting from a piston at bottom dead center, and $\lambda$ is the ratio r/L, with L as the connecting rod length and r as the crank radius.

2. The internal combustion engine of claim 1, where the distance from the peripheral surface of the outward-facing side of the compensation weight to the longitudinal axis of the crankshaft starting from the center plane and running towards at least one lateral side of the compensation weight increases in magnitude in a direction toward the at least one lateral side.

3. The internal combustion engine of claim 1, where the distance from the peripheral surface of the outward-facing side of the compensation weight to the longitudinal axis of the crankshaft starting from the center plane and running towards both lateral sides of the compensation weight increases in magnitude in both of the directions towards the lateral sides.

4. The internal combustion engine of claim 3, where the distance from the peripheral surface of the outward-facing side of the compensation weight to the longitudinal axis of the crankshaft starting from the center plane and running towards both lateral sides of the compensation weight increases correspondingly in a direction towards both sides, so that the compensation weight is formed symmetrically about the center plane.

5. The internal combustion engine of claim 3, where the center plane extends through a longitudinal axis of a piston pin in the piston when the piston is arranged at bottom dead center (BDC).

6. The internal combustion engine of claim 1, where the distance from the surface of the outward-facing side running in the peripheral direction to the longitudinal axis of the crankshaft is given by the function $s(\alpha)$ and $s(\alpha)=R+R\,[1-\cos(\alpha)-1/\lambda(1-\lambda^2\sin^2(\alpha)+2\lambda\mu\,\sin(\alpha)-\mu^2)^{0.5}+1/\lambda(1-\mu^2)^{0.5}]$, where R designates the distance $s(\alpha=0)$ in the center plane, $\alpha$ is the rotary angle of the crankshaft starting from a piston at bottom dead center, $\lambda$ is the ratio r/L, with L as the connecting rod length and r as the crank radius, and $\mu$ is the ratio A/L, with A as the distance of the longitudinal axis of the crankshaft from the longitudinal axis of the at least one piston.

7. The internal combustion engine of claim 1, where the compensation weight is configured to at least partially compensate for mass forces generated via the crank drive or for mass forces of the first order generated via the crank drive.

8. A method for production of an engine crankshaft, comprising:
forging a crankshaft and a compensation weight arranged on the crankshaft, the compensation weight including an outward-facing side having a peripheral surface, where a distance from the peripheral surface of the outward-facing side to a longitudinal axis of the crankshaft is not constant along the length of the peripheral surface of the outward-facing side,
where the distance from the peripheral surface of the outward-facing side running in the peripheral direction to the longitudinal axis of the crankshaft is given by the function s(α) and s(α)=R+R [1−cos(α)+1/λ− 1/λ, (1−sin²(α))^{0.5}], where R designates the distance s(α=0) in the center plane, α is the rotary angle of the crankshaft starting from a piston at bottom dead center, and λ is the ratio r/L, with L as the connecting rod length and r as the crank radius.

9. The method of claim 8, wherein the crankshaft is drop-forged together with the at least one compensation weight arranged on the crankshaft.

10. An engine comprising:
a crankshaft;
a crankcase at least partially enclosing the crankshaft; and
a compensation weight arranged on the crankshaft including a peripheral surface of an outward-facing side, a distance between a rotational axis of the crankshaft and the peripheral surface varying along the length of the peripheral surface; and
where the distance from the peripheral surface of the outward-facing side running in the peripheral direction to the longitudinal axis of the crankshaft is given by the function s(α) and s(α) =R+R [1−cos(α)+1/λ− 1/λ, (1−sin²(α))^{0.5}], where R designates the distance s(α=0) in the center plane, a is the rotary angle of the crankshaft starting from a piston at bottom dead center, and λ is the ratio r/L, with L as the connecting rod length and r as the crank radius.

11. The engine of claim 10, where the distance between the rotational axis of the crankshaft and the peripheral surface of the compensation weight increases in at least one of a direction toward a first lateral side of the compensation weight and a direction toward a second lateral side of the compensation weight, and wherein the crankshaft is integral with the compensation weight.

12. The engine of claim 11, where the peripheral surface is curved.

13. The engine of claim 10, where the distance between the rotational axis of the crankshaft and the peripheral surface of the compensation weight increases in a direction toward a first lateral side of the compensation weight.

14. The engine of claim 13, where the distance between the rotational axis of the crankshaft and the peripheral surface of the compensation weight increases in both a direction towards the first lateral side and a direction toward a second, different, lateral side.

* * * * *